(No Model.)
F. M. HOYT.
BICYCLE SADDLE.
No. 576,192. Patented Feb. 2, 1897.
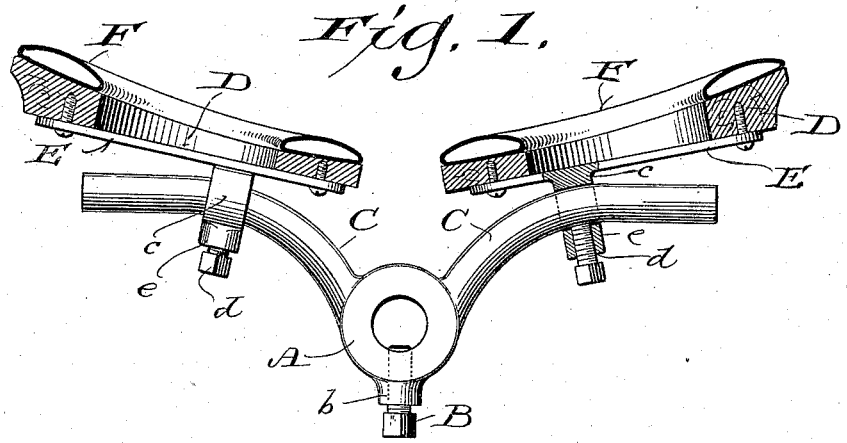
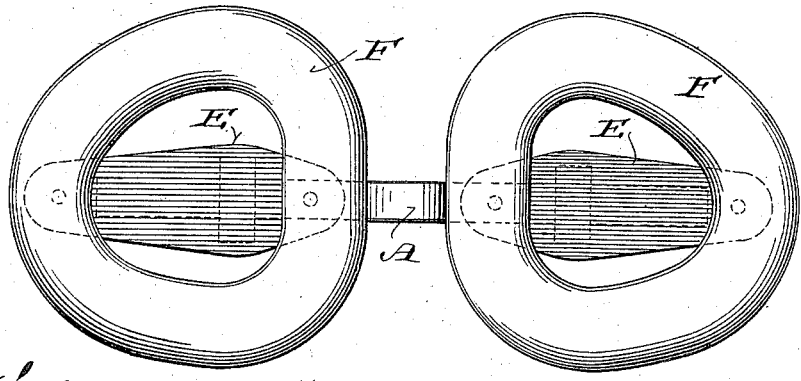
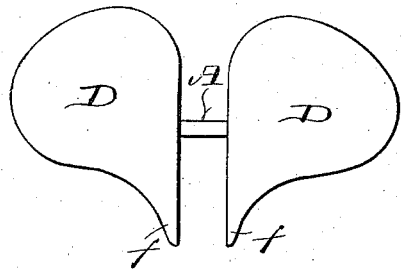
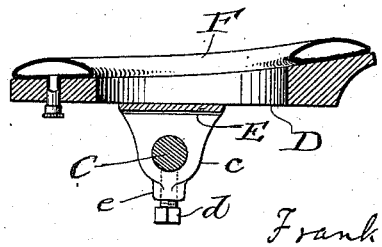
WITNESSES
Geo. W. Young,
N. E. Oliphant
INVENTOR
Frank M. Hoyt
By H. G. Underwood
ATTORNEY
THE NORRIS PETERS CO., PHOTO-LITHO., WASHINGTON, D. C.

UNITED STATES PATENT OFFICE.

FRANK M. HOYT, OF MILWAUKEE, WISCONSIN.

BICYCLE-SADDLE.

SPECIFICATION forming part of Letters Patent No. 576,122, dated February 2, 1897.

Application filed October 16, 1895. Serial No. 565,842. (No model.)

*To all whom it may concern:*

Be it known that I, FRANK M. HOYT, a citizen of the United States, and a resident of Milwaukee, in the county of Milwaukee and State of Wisconsin, have invented certain new and useful Improvements in Bicycle-Saddles; and I do hereby declare that the following is a full, clear, and exact description thereof.

My invention has for its object to provide a bicycle-saddle that will not exert pressure on the prostate gland of the rider and which may be readily adjusted to conform to the physical structure of said rider in order to avoid strain, heating, chafing, or other inconvenience. Hence said invention consists in certain peculiarities of construction and combination of parts hereinafter set forth with reference to the accompanying drawings and subsequently claimed.

In the drawings, Figure 1 represents a partly sectional view of a bicycle-saddle constructed according to my invention; Fig. 2, a plan view of the same; and Fig. 3, a detail sectional view illustrating a saddle-pad in place on its support, the line of section being at a right angle to that on which the pads in the first figure are viewed. Fig. 4 represents a plan view of a saddle that differs somewhat in form and construction of pads from those shown in the preceding figures.

Referring by letter to the drawings, A represents an eye for engagement of the head of a bicycle-seat post, and a set-screw B, operative in a boss $b$, depending from the eye, serves as a means for holding the same in place on the post-head. Diverging laterally in opposite directions from the eye A are a pair of upwardly-curved and horizontally-extended arms C, the latter and said eye constituting the pad-support of my improved saddle. The saddletree-arms C are loosely engaged with eyes $c$, depending from pads D, and set-screws $d$, operative in bosses $e$, constituting part of the latter eyes, serve to maintain the pads in adjusted position on said arms.

The pads D may be of various construction, that form shown in full lines, Figs. 1 to 3, inclusive, being buttock-shaped apertured plates joined to transverse bars E, from which the eyes $c$, above specified, depend, the upper face of said plates being preferably inclined, so as to have their thickness increase in an outward direction. I also show that the pads may be faced with pneumatic or other suitable cushions F, the latter being cemented or otherwise secured in place.

As shown in Fig. 4, the pads may have forward extensions $f$, but detail in the matter of construction on the part of said pads is not as material as the provision for their adjustment so as to vary the interval between their inner edges, as well as tilt on the arms C, either lateral or fore and aft. Hence particular attention is called to the upward curve of said arms and the eye and set-screw connection of said pads therewith. The arms being curved upward from the eye A and horizontally extended, the pads may be adjusted laterally, so as to have more or less tilt toward the center of the saddle in proportion to the physical structure of the rider. A person of narrow build will be most comfortable on the saddle when the pads are adjusted on the curved portions of the treearms C, while for persons of stout build said pads should be set on the horizontal extensions of said arms, the intervening space between the aforesaid pads being increased in proportion to their lateral adjustment in an outward direction, whereby pressure on the prostate gland of the rider and other inconveniences are avoided. It also follows that the tilt of the pads either fore or aft is determined by rotatory adjustment on the arms C, it being understood that said pads are held fast in the position to which they are adjusted.

Having now fully described my invention, what I claim as new, and desire to secure by Letters Patent, is—

1. In a longitudinally-divided bicycle-saddle, a pair of pads adjustable to have more or less tilt toward the center of said saddle.

2. In a bicycle-saddle, a support comprising a pair of upwardly-curved and horizontally-extended divergent arms, and a pair of pads in rotatory clamp connection with the arms, these clamps being laterally adjustable on said arms to vary intervening space as well as tilt toward the center of the saddle.

In testimony that I claim the foregoing I have hereunto set my hand at Milwaukee, in the county of Milwaukee and State of Wisconsin, in the presence of two witnesses.

FRANK M. HOYT.

Witnesses:
N. E. OLIPHANT,
B. C. ROLOFF.